(12) United States Patent
Jeong et al.

(10) Patent No.: US 11,787,154 B2
(45) Date of Patent: Oct. 17, 2023

(54) DISPLAY PROTECTOR

(71) Applicant: WHITESTONE CO., LTD., Chungcheongnam-do (KR)

(72) Inventors: Jae Yong Jeong, Chungcheongnam-do (KR); Myoung Sik Kim, Gyeonggi-do (KR); Myoung Jin Cha, Gyeonggi-do (KR); Bin Hee Kwon, Chungcheongnam-do (KR); Su Yeol Kim, Chungcheongnam-do (KR)

(73) Assignee: WHITESTONE CO., LTD., Chungcheongnam-do (KR)

(*) Notice: Subject to any disclaimer, the term of this patent is extended or adjusted under 35 U.S.C. 154(b) by 0 days.

(21) Appl. No.: 17/847,155

(22) Filed: Jun. 22, 2022

(65) Prior Publication Data
US 2023/0226802 A1    Jul. 20, 2023

(30) Foreign Application Priority Data
Jan. 14, 2022  (KR) .......................... 10-2022-0006172

(51) Int. Cl.
| | | |
|---|---|---|
| *B32B 7/12* | (2006.01) | |
| *B32B 17/10* | (2006.01) | |
| *B32B 27/08* | (2006.01) | |
| *G06F 1/16* | (2006.01) | |

(52) U.S. Cl.
CPC ............ *B32B 7/12* (2013.01); *B32B 17/10* (2013.01); *B32B 27/08* (2013.01); *B32B 2250/03* (2013.01); *B32B 2307/546* (2013.01); *B32B 2307/732* (2013.01); *B32B 2457/20* (2013.01); *G06F 1/1652* (2013.01)

(58) Field of Classification Search
None
See application file for complete search history.

(56) References Cited

U.S. PATENT DOCUMENTS

| | | |
|---|---|---|
| 11,161,323 B2 | 11/2021 | Choi et al. |
| 2017/0212051 A1 | 7/2017 | De Lacerda |
| 2018/0088392 A1 | 3/2018 | Park et al. |

(Continued)

FOREIGN PATENT DOCUMENTS

| | | |
|---|---|---|
| CN | 110050046 | 7/2019 |
| CN | 213108553 | 5/2021 |

(Continued)

OTHER PUBLICATIONS

"Office Action of Taiwan Counterpart Application" with English concise explanation, dated Mar. 30, 2023, p. 1-p. 9.

(Continued)

*Primary Examiner* — Ramsey Zacharia
(74) *Attorney, Agent, or Firm* — JCIPRNET (57) ABSTRACT

Provided is a display protector including: a first transparent base layer having a first surface and a second surface which face each other; a second transparent base layer having a third surface and a fourth surface which face each other, and arranged so that the third surface faces the second surface; an intermediate stress relief adhesive layer arranged between the second surface and the third surface; a first outer stress relief adhesive layer over the first surface; a second outer stress relief adhesive layer over the fourth surface; and an ultra-thin glass (UTG) layer on the first outer stress relief adhesive layer.

9 Claims, 8 Drawing Sheets

(56) References Cited

U.S. PATENT DOCUMENTS

| | | |
|---|---|---|
| 2019/0316004 A1 | 10/2019 | Clapper et al. |
| 2020/0133342 A1 | 4/2020 | Choi et al. |
| 2021/0184161 A1 | 6/2021 | Song et al. |
| 2022/0115471 A1* | 4/2022 | Lee .................... H01L 51/0097 |

FOREIGN PATENT DOCUMENTS

| | | |
|---|---|---|
| KR | 1020170064850 | 6/2017 |
| KR | 1020180034056 | 4/2018 |
| KR | 1020180096448 | 8/2018 |
| KR | 1020180138474 | 12/2018 |
| KR | 1020190098435 | 8/2019 |
| KR | 1020200049942 | 5/2020 |
| KR | 1020210075246 | 6/2021 |
| WO | 2018155819 | 8/2018 |

OTHER PUBLICATIONS

"Search Report of Europe Counterpart Application", dated Dec. 6, 2022, p. 1-p. 7.

* cited by examiner

| DIVISION | | EXAMPLE 1 | |
|---|---|---|---|
| | | IMMEDIATELY AFTER PEELING | 3~4 DAYS AFTER PEELING |
| Flip / Fold | LINEAR BUBBLE |  |  |
| | |  |  |
| | TRAPPED BUBBLE |  |  |
| | |  |  |

FIG. 7

| DIVISION | | COMPARATIVE EXAMPLE 1 | |
|---|---|---|---|
| | | IMMEDIATELY AFTER PEELING | 3~4 DAYS AFTER PEELING |
| TRAPPED BUBBLE | |  |  |
| | |  |  |

DISPLAY PROTECTOR

CROSS-REFERENCE TO RELATED APPLICATION

This application is based on and claims priority under 35 U.S.C. § 119 to Korean Patent Application No. 10-2022-0006172, filed on Jan. 14, 2022, in the Korean Intellectual Property Office, the disclosure of which is incorporated by reference herein in its entirety.

BACKGROUND

Technical Field

One or more embodiments relate to a display protector, and more particularly, to a display protector that has excellent folding reliability so as not to peel off even when used for a long time on a foldable terminal or a rollable terminal, is capable of spontaneously reattaching after peeling, and is capable of being detached relatively easily when desired.

Description of Related Art

As foldable terminals and rollable terminals are gradually put into practical use, the demand for display protectors capable of projecting display areas of the foldable terminals and rollable terminals is also increasing. In particular, display protectors employed on foldable terminals and rollable terminals must withstand folding and rolling numerous times over a long period of time. Accordingly, there is a demand for a display protector having high reliability against folding and rolling.

SUMMARY

One or more embodiments include a display protector that has excellent folding reliability so as not to peel off even when used for a long time on a foldable terminal or a rollable terminal, is capable of spontaneously reattaching after peeling, and is capable of being detached relatively easily when desired.

Additional aspects will be set forth in part in the description which follows and, in part, will be apparent from the description, or may be learned by practice of the presented embodiments of the disclosure.

According to one or more embodiments, a display protector includes a first transparent base layer having a first surface and a second surface which face each other, a second transparent base layer having a third surface and a fourth surface which face each other, and arranged so that the third surface faces the second surface, an intermediate stress relief adhesive layer arranged between the second surface and the third surface, a first outer stress relief adhesive layer over the first surface, a second outer stress relief adhesive layer over the fourth surface, and an ultra-thin glass (UTG) layer on the first outer stress relief adhesive layer.

In some embodiments, a thickness of the first transparent base layer may be substantially equal to a thickness of the second transparent base layer. In some embodiments, a thickness of the first outer stress relief adhesive layer may be substantially equal to a thickness of the second outer stress relief adhesive layer.

In some embodiments, a material of the first transparent base layer may be substantially the same as a material of the second transparent base layer. In some embodiments, a storage modulus of the first outer stress relief adhesive layer may be less than or substantially equal to a storage modulus of the second outer stress relief adhesive layer.

In some embodiments, a storage modulus of each of the first outer stress relief adhesive layer and the second outer stress relief adhesive layer may be about 0.1 MPa to about 0.5 MPa at −20° C. In some embodiments, a storage modulus of each of the first outer stress relief adhesive layer and the second outer stress relief adhesive layer may be about 0.02 MPa to about 0.2 MPa at +40° C. In some embodiments, a storage modulus of the intermediate stress relief adhesive layer may be about 0.02 MPa to about 0.2 MPa at +40° C., and the storage modulus of the intermediate stress relief adhesive layer may be greater than the storage modulus of the first outer stress relief adhesive layer and may be less than the storage modulus of the second outer stress relief adhesive layer.

In some embodiments, each of the first outer stress relief adhesive layer and the second outer stress relief adhesive layer may have an adhesive strength of about 600 g/in to about 1,500 g/in. In some embodiments, there may be no scattering-prevention coating layer on the UTG layer.

BRIEF DESCRIPTION OF THE DRAWINGS

The above and other aspects, features, and advantages of certain embodiments of the disclosure will be more apparent from the following description taken in conjunction with the accompanying drawings, in which.

DESCRIPTION OF THE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which exemplary embodiments of the present disclosure are shown. The present disclosure may, however, be embodied in many different forms and should not be construed as being limited to the exemplary embodiments set forth herein. Rather, these embodiments are provided so that this disclosure will be thorough and complete, and will fully convey the concept of the present disclosure to those skilled in the art. Like reference numerals in the drawings denote like elements. Furthermore, various elements and areas in the drawings are schematically drawn. Accordingly, the present disclosure is not limited by the relative size or spacing drawn in the accompanying drawings.

While such terms as "first," "second," etc., may be used to describe various components, such components must not be limited to the above terms. The above terms are used only to distinguish one component from another. For example, without departing from the scope of the present disclosure, a first component may be referred to as a second component, and conversely, the second component may be referred to as a first component.

Terms used in the present disclosure is only used to describe specific embodiments, and are not intended to limit the concept of the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined otherwise, all terms used herein have the same meaning as commonly understood by one of ordinary skill in the art to which the present disclosure belongs, including technical and scientific terms. In addition, commonly used terms as defined in the dictionary should be construed as having a meaning consistent with their meaning in the context of the relevant technology, and it will be understood that they should not be construed in an overly formal sense unless explicitly defined herein.

When a certain embodiment may be implemented differently, a specific process order may be performed differently from the described order. For example, two consecutively described processes may be performed substantially at the same time or performed in an order opposite to the described order.

In the accompanying drawings, variations of the illustrated shapes may be expected, for example depending on manufacturing technology and/or tolerances. Accordingly, embodiments of the present disclosure should not be construed as limited to the specific shape of an area shown in the present disclosure, but should include, for example, a change in shape resulting from a manufacturing operation. In addition, a term "substrate" used in the present disclosure may mean a substrate itself, a stacked structure including a substrate and a certain layer or film formed on a surface of the substrate. Also, in the present disclosure, a term "surface of a substrate" may mean an exposed surface of the substrate, or an outer surface of a certain layer or film formed on the substrate.

Figure 1:
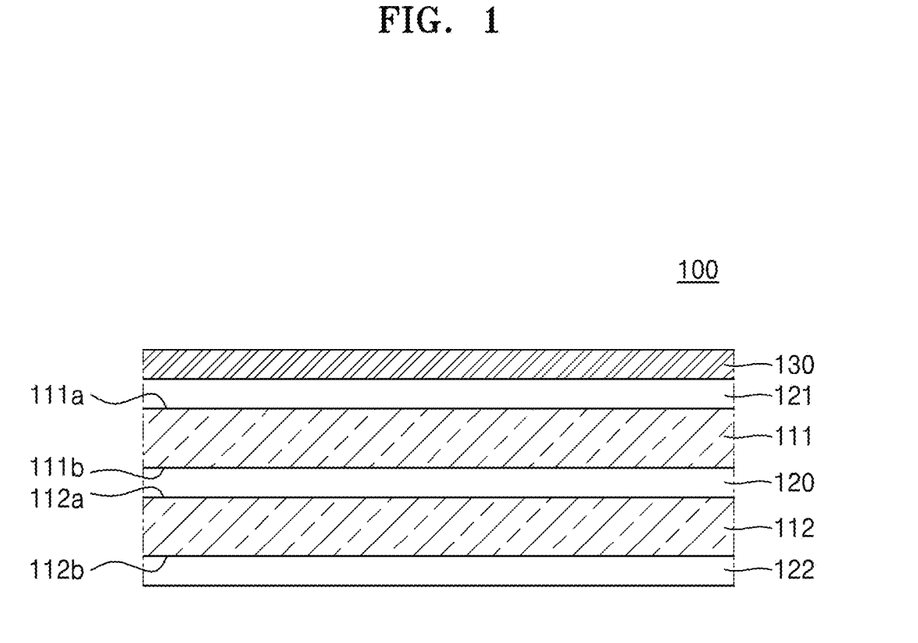
FIG. 1 is a schematic diagram conceptually illustrating a stacked structure of a display protector according to an embodiment.

FIG. 1 is a schematic diagram conceptually illustrating a stacked structure of a display protector 100 according to an embodiment.

Referring to FIG. 1, the display protector 100 includes a first transparent base layer 111, a second transparent base layer 112, and an intermediate stress relief adhesive layer 120 therebetween.

The first transparent base layer 111 may have a first surface 111a and a second surface 111b, which face each other and extend in parallel. Also, the second transparent base layer 112 may have a third surface 112a and a fourth surface 112b, which face each other and extend in parallel. The first transparent base layer 111 and the second transparent base layer 112 may be arranged such that the second surface 111b and the third surface 112a face each other.

In addition, a first outer stress relief adhesive layer 121 may be provided on the first surface 111a of the first transparent base layer 111, and a second outer stress relief adhesive layer 122 may be provided on the fourth surface 112b of the second transparent base layer 112. Hereinafter, a structure including the first outer stress relief adhesive layer 121, the first transparent base layer 111, the intermediate stress relief adhesive layer 120, the second transparent base layer 112, and the second outer stress relief adhesive layer 122 is referred to as a folding flexibility enhancement film (FFEF).

In addition, an ultra-thin glass (UTG) layer 130 may further be provided on the first outer stress relief adhesive layer 121.

First and second transparent base layers

As described above, the first transparent base layer 111 has the first surface 111a and the second surface 111b, which face each other and extend in parallel, and the second transparent base layer 112 has the third surface 112a and the fourth surface 112b, which face each other and extend in parallel.

The first transparent base layer 111 and the second transparent base layer 112 may each include, for example, a polyurethane resin, a polyester resin, and/or a (meth)acrylic resin.

In some embodiments, the polyurethane resin may have a weight-average molecular weight of about 100,000 to about 3,000,000.

In some embodiments, the polyurethane resin may be a polymerization product of a multifunctional isocyanate compound having two or more isocyanate groups (–N=C=O) and a polyol compound.

The multifunctional isocyanate compound may be an aliphatic, aromatic, alicyclic, or aromatic aliphatic isocyanate compound.

Among multifunctional isocyanate compounds, the aliphatic isocyanate compound may be, for example, at least one selected from ethylene diisocyanate, trimethylene diisocyanate, tetramethylene diisocyanate, hexamethylene diisocyanate (HMDI), octamethylene diisocyanate, nonamethylene diisocyanate, dodecamethylene diisocyanate, 2,2-dimethylpentane diisocyanate 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 2,2,4-trimethylhexamethylene diisocyanate, lysine diisocyanate, 2,6-diisocyanate methyl caproate, bis(2-isocyanateethyl) fumarate, bis(2-isocyanateethyl) carbonate, 2-isocyanateethyl-2,6-diisocyanate hexanoate, 1,3,5-hexamethylene triisocyanate, 1,8-diisocyanate-4-isocyanate, bis(isocyanatoethyl) ether, 1,4-butylene glycol dipropyl ether-ω,ω'-diisocyanate, lysine diisocyanate methyl ester, 2-isocyanatoethyl-2,6-diisocyanatoethyl-2,6-diisocyanato hexanoate, 2-isocyanato propyl-2,6-diisocyanato hexanoate, 2,6-di(isocyanatomethyl)furan, 1,3-bis(6-isocyanate hexyl)-uretidine-2,4-dione, and 1,3,5-tris(6-isocyanato hexyl)isocyanurate, but the present disclosure is not limited thereto.

Among the multifunctional isocyanate compounds, the aromatic isocyanate compound may be, for example, phenylene 1,4-diisocyanate, tolylene-2,4- and/or –2,6-diisocyanate (TDI), naphthylene 1,5-diisocyanate, diphenylmethane 2,2'- and/or 2,4'-, and/or 4,4'-diisocyanate (MDI), and/or an advanced homologue (pMDI), but the present disclosure is not limited thereto.

Among the multifunctional isocyanate compounds, an alicyclic isocyanate compound may be, for example, at least one selected from isophorone diisocyanate (IPDI), 4,4'-dicyclohexylmethane diisocyanate, cyclohexylene diisocyanate, methylcyclohexylene diisocyanate, bis(2-isocyanate-ethyl)-4-cyclohexene-1,2-dicarboxylate, 2,5-norbornane diisocyanate, 2,6-norbornane diisocyanate, 2,2-dimethyl dicyclohexylmethane diisocyanate, bis(4-isocyanato-n-butylidene)pentaerythritol, dimer acid diisocyanate, isocyanatomethyl-3-(3-isocyanatopropyl)-5-isocyanatomethyl-bicyclo [2.2.1]-heptane, 2-isocyanatomethyl-3-(3-isocyanatopropyl)-6-isocyanatomethyl-bicyclo [2.2.1]-heptane, 2-isocyanatomethyl-2-(3-isocyanatopropyl)-5-isocyanatomethyl-bicyclo [2.2.1]-heptane, 2-isocyanatomethyl-2-(3-isocyanatopropyl)-6-isocyanatomethyl-bicyclo [2.2.1]-heptane, 2-isocyanatomethyl-3-(3-isocyanatopropyl)-6-(2-isocyanatoethyl)-bicyclo [2.2.1]-heptane, 2-isocyanatomethyl-3-(3-isocyanatopropyl)-6-(2-isocyanatoethyl)-bicyclo [2.1.1]-heptane, 2-isocyanatomethyl-2-(3-isocyanatopropyl)-5-(2-isocyanatoethyl)-bicyclo [2.1.1]-heptane, 2-isocyanatomethyl-2-(3-isocyanatopropyl)-6-(2-isocyanatoethyl)-bicyclo [2.2.1]-heptane, and norbornane bis(isocyanatomethyl), but the present disclosure is not limited thereto.

Among the multifunctional isocyanate compounds, the aromatic aliphatic isocyanate compound may be, for example, 1,3-bis(isocyanatomethyl)benzene (m-xylene diisocyanate, m-XDI), 1,4-bis(isocyanatomethyl)benzene (p-xylene diisocyanate, p-XDI), 1,3-bis(2-isocyanatopropan-2-yl)benzene (m-tetramethyl xylene diisocyanate, m-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butyl benzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene, 1,4- bis(isocyanatomethyl) naphthalene, xylylene diisocyanate, bis(isocyanatoethyl) benzene, bis(isocyanatopropyl)benzene, α, α, α',α'-tetramethyl xylylene diisocyanate, bis(isocyanatobutyl)benzene, bis(isocyanatopropyl)naphthalene, bis(isocyanatomethyl) diphenyl ether, and bis(isocyanatoethyl)phthalate, but the present disclosure is not limited thereto.

The polyol compound may be, for example, ethylene glycol, diethylene glycol, 1,2-propylene glycol, 1,3-butylene glycol, 1,4-butanediol, 1,5-pentanediol, 1,6-hexanediol, 1,9-nonanediol, 1,10-decanediol, 2,2-dimethyl-1,3-propanediol, 1,3-propanediol, 2-methyl-1,3-propanediol, 2,2-diethyl-1,3-propanediol, 3-methyl-1,5-pentanediol, neopentyl glycol, 2-methyl-1,8-octanediol, dipropylene glycol, or the like, but the present disclosure is not limited thereto.

In some embodiments, the polyester resin may have a weight-average molecular weight of about 100,000 to about 3,000,000.

The polyester resin is a polymer having an ester bond, and is mainly a polycondensate of a polyhydric carboxylic acid and a polyhydric alcohol. As for the polyhydric carboxylic acid used, a divalent dicarboxylic acid is mainly used, including, for example, isophthalic acid, terephthalic acid, dimethyl terephthalate, methyl naphthalenedicarboxylate, or the like. In addition, as for the polyhydric alcohol used, dihydric diol is mainly used, and a description thereof is described above, and thus further description is omitted here.

Particular examples of the polyester resin may polyethylene terephthalate, polybutylene terephthalate, polyethylene naphthalate, polybutylene naphthalate, polytrimethylene terephthalate, polytrimethylene naphthalate, polycyclohexanedimethyl terephthalate, plycyclohexanedimethyl naphthalate, or the like. A blend rein of the above examples or a copolymer may also be preferably used.

In some embodiments, the (meth) acrylic resin may have a weight-average molecular weight of about 100,000 to about 3,000,000.

The (meth) acrylic resin may be a polymerization product of a (meth)acrylate monomer and/or a (meth)acrylate oligomer.

The (meth)acrylate monomer may be, for example, a multifunctional (meth)acrylate compound. The term 'multifunctional (meth) acrylate compound' may mean a (meth) acrylate compound having two or more polymerizable functional groups.

In particular, the multifunctional (meth)acrylate may be a difunctional actrylate compound such as ethyleneglycol di(meth)acrylate, diethyleneglycol di(meth)acrylate, butanediol (meth)acrylate, hexanediol di(meth)acrylate, nonanedioldi(meth)acrylate, ethoxylated hexanediol di(meth)acrylate, propoxylated hexanediol di(meth)acrylate, diethyleneglycol di(meth)acrylate, polyethyleneglycol di(meth)acrylate, tripropyleneglycol di(meth)acrylate, polypropyleneglycol di(meth)acrylate, acrylateneopentylglycol di(meth)acrylate, epoxidized neopentylglycol di(meth)acrylate, tripropyleneglycol di(meth)acrylate, polypropyleneglycol di(meth)acrylate, neopentylglycoldi(meth)acrylate, ethoxylated neopentylglycol di(meth)acrylate, tripropyleneglycol di(meth)acrylate, hydroxypivalate neopentylglycol di(meth)acrylate or the like, a trifunctional acrylate compound such as trimethylolpropane tri(meth)acrylate, ethoxylated trimethylolpropane tri(meth)acrylate, propoxylated trimethylolpropane tri(meth)acrylate, tris 2-hydroxyethylisocyanurate tri(meth)acrylate or glycerin tri(meth) acrylate, pentaerythritol tri(meth)acrylate, dipentaerythritol tri(meth)acrylate or ditrimethylolpropane tri(meth)acrylate, or the like, or a multifunctional acrylate compound with more than trifunctionality such as pentaerythritol tetra(meth) acrylate, ditrimethylolpropane tetra(meth)acrylate, dipentaerythritol tetra(meth)acrylate, dipentaerythritol penta(meth)acrylate, ditrimethylorpropane penta(meth)acrylate, dipentaerythritol hexa(meth)acrylate or ditrimethylolpropane hexa (meth)acrylate, or the like, but the present disclosure is not limited thereto.

The (meth)acrylate oligomer may be, for example, epoxy (meth)acrylate, urethane (meth)acrylate, polyester (meth) acrylate, polybutadiene (meth)acrylate, silicone (meth)acrylate, alkyl (meth)acrylate , or the like, but the present disclosure is not limited thereto. In some embodiments, the (meth)acrylic resin may be prepared by using urethane acrylate as a main material as the (meth)acrylate oligomer.

In some embodiments, one or more of JWR-6, JWR-AEF-01, JWR-AEF-02 film products commercially available from Jaewon Industry may be selected and used as at least one of the first transparent base layer 111 and the second transparent base layer 112.

In some embodiments, the first transparent base layer 111 and the second transparent base layer 112 may include substantially the same material.

Each of the first transparent base layer 111 and the second transparent base layer 112 may have a thickness of about 10 μm to about 40 μm, about 12 μm to about 35 μm, about 14 μm to about 30 μm, about 15 μm to 25 μm, or any range between these values. In some embodiments, each of the first transparent base layer 111 and the second transparent base layer 112 may have better foldability at a thickness of about 15 μm to about 25 μm.

In some embodiments, the thickness of the first transparent base layer 111 may be substantially equal to the thickness of the second transparent base layer 112. In some other embodiments, the first transparent base layer 111 and the second transparent base layer 112 may have different thicknesses from each other.

When the thickness of each of the first transparent base layer 111 and the second transparent base layer 112 is out of the above range and too thin, a mechanical strength may be insufficient, and an effect of preventing glass scattering when a UTG layer is damaged may be insufficient. On the other hand, when the thickness of each of the first transparent base layer 111 and the second transparent base layer 112 is out of the above range and too thick, a shear stress may be excessively concentrated on a folded portion when the display protector 100 is folded, and a lifting phenomenon may easily occur when folding and unfolding are repeated.

In some embodiments, the first transparent base layer 111 and the second transparent base layer 112 may each independently have a storage elastic modulus of about 2 GPa to about 6 GPa at −20° C. In some embodiments, the first transparent base layer 111 and the second transparent base layer 112 may each independently have a storage elastic modulus of about 2 GPa to about 6 GPa, about 2.2 GPa to about 5.8 GPa, about 2.4 GPa to about 5.6 GPa, about 2.6 GPa to about 5.4 GPa, about 2.8 GPa to about 5.2 GPa, about 3 GPa to about 5 GPA, or any range between these values at −20° C. Hereinafter, 'storage elastic modulus' and 'storage modulus' have the same meaning and have the same meaning as storage modulus.

When the storage elastic modulus of each of the first transparent base layer 111 and the second transparent base layer 112 is out of the above range and too small, a restoring force thereof may be insufficient, and when the storage elastic modulus of each of the first transparent base layer 111 and the second transparent base layer 112 is out of the above range and too large, the folding characteristics thereof may be reduced.

In some embodiments, each of the first transparent base layer 111 and the second transparent base layer 112 may have an elongation of about 30% to about 250%. In some embodiments, the first transparent base layer 111 and the second transparent base layer 112 may each independently have an elongation of about 30% to about 250%, about 40% to about 230%, about 50% to about 200%, about 60% to 190%, about 70% to about 180%, about 80% to about 170%, about 90% to about 160%, about 100% to about 150%, or any range between these values. When the elongation of each of the first transparent base layer 111 and the second transparent base layer 112 is too low, the restoring force thereof may be insufficient, and when the elongation of each of the first transparent base layer 111 and the second transparent base layer 112 is high, the folding characteristics thereof may be reduced.

Intermediate stress relief adhesive layer, first outer stress relief adhesive layer, and second outer stress relief adhesive layer The intermediate stress relief adhesive layer 120, the first outer stress relief adhesive layer 121, and the second outer stress relief adhesive layer 122 may each independently include an acrylic polymer or a polysiloxane compound.

The acrylic polymer may be, for example, a polymerization product of a (meth)acrylic monomer.

In particular, the (meth) acrylic monomer may be a monofunctional monomer such as n-butyl(meth)acryl ate, 2-butyl(meth)acrylate, t-butyl(meth)acrylate, isobutyl(meth)acrylate, hexyl(meth)acrylate, cyclohexyl(meth)acrylate, N-vinylpyrrolidone, 2-ethylhexyl(meth)acrylate, ethyl (meth)acrylate, methyl(meth)acrylate, n-propyl(meth)acrylate, isopropyl(meth)acrylate, pentyl(meth)acrylate, n-octyl (meth)acrylate, isooctyl(meth)acrylate, 2-methylbutyl (meth)acrylate, n-nonyl(meth)acrylate, isononyl(meth) acrylate, isoamyl(meth)acrylate, n-decyl(meth)acrylate, isodecyl(meth)acrylate, isobornyl(meth)acrylate, 4-methyl-2-pentyl(meth)acrylate, dodecyl(meth)acrylate, 2-dodecyl-thioethyl(meth)acrylate, lauryl(meth)acrylate, 2-ethoxyethyl (meth)acrylate, 2-methoxyethyl(meth)acrylate, hydroxyethyl(meth)acrylate, hydroxypropyl(meth)acrylate, hydroxybutyl(meth)acrylate, allyl(meth)acrylate, stearyl (meth)acrylate, phenoxyethyl(meth)acrylate, tetrafurfuryl (meth)acrylate, tetrahydrofuryl(meth)acrylate, acryloylmorpholine, or the like; a difunctional monomer such as 1,3-butanediol di(meth)acrylate, 1,4-butanediol di(meth) acrylate, 1,6-hexanediol di(meth)acrylate, 2-butyl-2-ethyl-1,3-propanedioldiacrylate, 1,9-nonanedioldiacrylate, ethyleneglycol di(meth)acrylate, bisphenol A-ethyleneglycoldiacrylate, diethyleneglycol di(meth)acrylate, triethyleneglycol di(meth)acrylate, tetraethyleneglycol di(meth) acrylate, propyleneglycoldi(meth)acrylate, dipropyleneglycoldi(meth)acrylate, tripropyleneglycol di(meth)acrylate, neopentylglycol di(meth)acrylate, dicyclopentanyl di(meth)acrylate, caprolactone-modified dicyclopentenyl(meth)acrylate, ethylene oxide-modified phosphate di(meth)acrylate, bis(2-hydroxyethyl)isocyanurate di(meth)acrylate, di(acryloxyethyl)isocyanurate, allylated cyclohexyl di(meth)acrylate, dimethyloldicyclopentane diacrylate, ethylene oxide-modified hexahydrophthalic acid diacrylate, tricyclodecanedimethanol acrylate, neopentylglycol-modified trimethylolpropane diacrylate, adamantane diacrylate, or the like; a trifunctional monomer such as trimethylolpropane tri(meth)acrylate, pentaerythritol tri (meth)acrylate, dipentaerythritol tri(meth)acrylate, propionic acid-modified trimethylolpropane tri(meth)acrylate, propylene oxide-modified trimethylolpropane tri(meth)acrylate, tris(2-hydroxyethyl)isocyanurate tri(meth)acrylate, tris (acryloxyethyl)isocyanurate, glycerol tri(meth)acrylate, or the like; a tetrafunctional monomer such as diglycerin tetra(meth)acrylate, pentaerythritoltetra(meth)acrylate, ditrimethylolpropane tetra(meth)acrylate, tetramethylolpropane tetra(meth)acrylate, or the like; a pentafunctional monomer such as dipentaerythritolpenta(meth)acrylate, propionic acid-modified dipentaerythritol penta(meth)acrylate, or the like; or a hexafunctional mono such as dipentaerythritol hexa(meth)acrylate, caprolactone-modified dipentaerythritol hexa(meth)acrylate, or the like, but the present disclosure is not limited thereto.

The (meth)acrylic monomer may be polymerized together with a comonomer. In some embodiments, the comonomer may include one or more of an alkyl (meth)acrylate monomer, a monomer having an ethylene oxide, a monomer having a propylene oxide, a monomer having an amine group, a monomer having an amide group, a monomer having an alkoxy group, a monomer having a phosphoric acid group, a monomer having a sulfonic acid group, a monomer having a phenyl group, and a monomer having a silane group, but is not limited thereto.

In some embodiments, the alkyl (meth)acrylate monomer may include, for example, an unsubstituted linear or branched alkyl(meth) acrylic acid ester having 1 to 20 carbon atoms. For example, the alkyl (meth)acrylate monomer may include one or more of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, lauryl (meth)acrylate, and isobornyl (meth)acrylate. In particular, there may be further an effect of increasing an initial adhesive strength by using an alkyl (meth)acrylic monomer having 4 to 8 carbon atoms as a comonomer.

In some embodiments, the monomer having an ethylene oxide may include, for example, one or more (meth)acrylate monomers containing an ethylene oxide group(-CH2CH2O-). For example, the monomer containing an ethylene oxide group may be polyethylene oxide alkyl ether (meth)acrylate such as polyethylene oxide monomethyl ether (meth)acrylate, polyethylene oxide monoethyl ether (meth)acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, polyethylene oxide mono-tertiary-butyl ether(meth)acrylate, or the like, but is not limited thereto.

In some embodiments, the monomer having a propylene oxide may be, for example, polypropylene oxide alkyl ether (meth)acrylate such as polypropylene oxide monomethyl ether(meth)acrylate, polypropylene oxide monoethyl ether (meth)acrylate, polypropylene oxide monopropyl ether (meth)acrylate, polypropylene oxide monobutyl ether(meth)acrylate, polypropylene oxide monopentyl ether(meth)acrylate, polypropylene oxide dimethyl ether(meth)acrylate, polypropylene oxide diethyl ether(meth)acrylate, polypropylene oxide monoisopropyl ether(meth)acrylate, polypropylene oxide monoisobutyl ether(meth)acrylate, polypropylene oxide mono-tertiary-butyl ether(meth)acrylate, or the like, but is not limited thereto.

In some embodiments, a monomer having an amino group may be, for example, a (meth)acrylic monomer containing an amino group, such as monomethylaminoethyl (meth)acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth)acrylate, methacryloxyethyltrimethylammonium chloride (meth)acrylate, or the like, but is not limited thereto.

In some embodiments, the monomer having an amide group may be, for example, a (meth)acrylic monomer containing an amide group, such as (meth)acrylamide, N-methylacrylamide, N-methylmethacrylamide, N-methylol(meth)acrylamide, N-methoxymethyl(meth)acrylamide, N,N-methylene bis(meth)acrylamide, 2-hydroxyethyl acrylamide, or the like, but is not limited thereto.

In some embodiments, the monomer having an alkoxyl group may be, for example, 2-methoxyethyl (meth)acrylate, 2-methoxypropyl (meth)acrylate, 2-ethoxypropyl (meth)acrylate, 2-butoxypropyl (meth)acrylate, 2-methoxypentyl (meth) acrylate, 2-ethoxypentyl (meth)acrylate, 2-butoxyhexyl (meth)acrylate, 3-methoxypentyl (meth)acrylate, 3-ethoxypentyl (meth)acrylate, 3-butoxyhexyl (meth)acrylate, but is not limited thereto.

In some embodiments, the monomer having a phosphoric acid group may be, for example, an acrylic monomer having a phosphoric acid group, such as 2-methacryloyloxyethyl diphenyl phosphate (meth)acrylate, trimethacryloyloxyethyl phosphate (meth)acrylate, tricryloyloxyethyl phosphate (meth)acrylate, or the like, but is not limited thereto.

In some embodiments, the monomer having a sulfonic acid group may be, for example, an acrylic monomer having a sulfonic acid group, such as sodium sulfopropyl (meth)acrylate, sodium 2-sulfoethyl (meth)acrylate, sodium 2-acrylamido-2-methylpropanesulfonate, or the like, but is not limited thereto.

In some embodiments, the monomer having a phenyl group may be, for example, an acrylic vinyl monomer having a phenyl group, such as p-tert-butylphenyl (meth)acrylate, o-biphenyl (meth)acrylate, or the like, but is not limited thereto.

In some embodiments, the monomer having a silane group may be, for example, a vinyl monomer having a silane group, such as 2-acetoacetoxyethyl (meth)acrylate, vinyltrimethoxysilane, vnyltriethoxysilane, vinyl tris(β-methoxyethyl)silane, vinyltriacetylsilane, methacryloyloxy propyltrimethoxysilane, or the like, but is not limited thereto.

The comonomer may be included in an amount of about 60% to about 95% by weight, for example, about 70% to about 90% by weight of a monomer mixture. In the above range, the first outer stress relief adhesive layer 121 and the second outer stress relief adhesive layer 122 may obtain an excellent adhesive strength and stress dissipation effect.

The acrylic polymer may have a weight-average molecular weight of about 100,000 to about 3,000,000.

The polysiloxane compound may be, for example, a polysiloxane compound of Formula 1 below.

<Formula 1> wherein, n is an integer from 100 to 10,000, $R^1$ to $R^8$ are each independently hydrogen, halogen, a nitrile group, a nitro group, an hydroxyl group, an amino group, a substituted or unsubstituted alkyl group having 1 to 10 carbon atoms, a substituted or unsubstituted alkoxy group having 1to 10 carbon atoms, a substituted or unsubstituted alkenyl group having 2 to 10 carbon atoms, a substituted or unsubstituted alkynyl group having 2 to 10 carbon atoms, a substituted or unsubstituted alkylenyl group having 2 to 10 carbon atoms, a substituted or unsubstituted cycloalkyl group having 3 to 15 carbon atoms, a substituted or unsubstituted aryl group having 6 to 15 carbon atoms, a substituted or unsubstituted aryloxy group having 6 to 15 carbon atoms, a substituted or unsubstituted arylalkyl group having 7 to 15 carbon atoms, or a substituted or unsubstituted alkylaryl group having 7 to 15 carbon atoms.

Here, 'substituted' means that a hydrogen atom bonded to a carbon atom of a compound or functional group is changed to another substituent, a position to be substituted is a position at which a hydrogen atom is substituted, and is not particularly limited as long as it is a position substitutable by a substituent. In addition, when two or more substituents are substituted, the two or more substituents may be the same as or different from each other.

Here, "substituted or unsubstituted" means being substituted with one or two or more substituents selected from a group consisting of deuterium; halogen; a nitrile group (–CN); a nitro group; a hydroxyl group; an amino group; a silyl group; a boron group; an alkoxy group; an aryloxy group; an alkyl group; a cycloalkyl group; an aryl group; and a heterocyclic group, substituted with a substituent in which two or more substituents among the substituents stated above are connected, or not having any substituents. For example, the 'substituent in which two or more substituents are connected' may be a biphenyl group. That is, the biphenyl group may be an aryl group or may be interpreted as a substituent in which two phenyl groups are connected.

The intermediate stress relief adhesive layer 120, the first outer stress relief adhesive layer 121, and the second outer stress relief adhesive layer 122 may each independently have a thickness of about 10 µm to about 40 µm, about 11 µm to about 38 µm, about 12 µm to about 36 µm, about 13 µm to about 34 µm, about 14 µm to about 32 µm, about 15 µm to about 30 µm, or any range between these values. In some embodiments, the intermediate stress relief adhesive layer 120, the first outer stress relief adhesive layer 121, and/or the second outer stress relief adhesive layer 122 may have the best foldability at a thickness of about 15 µm.

When the thickness of each of the intermediate stress relief adhesive layer 120, the first outer stress relief adhesive layer 121, and the second outer stress relief adhesive layer 122 is out of the above range and too thin, an effect of relieving stress may be insufficient, and peeling (lifting) may occur. On the other hand, when the thickness of each of the intermediate stress relief adhesive layer 120, the first outer stress relief adhesive layer 121, and the second outer stress relief adhesive layer 122 is out of the above range and too thick, the stress of folding may be withstood, but a stress generated on both surfaces of a stress relief adhesive layer becomes excessively unbalanced, and peeling (lifting) of a folding portion may occur.

In some embodiments, the thickness of the first outer stress relief adhesive layer 121 may be substantially equal to the thickness of the second outer stress relief adhesive layer 122. In some embodiments, the intermediate stress relief adhesive layer 120 may have a thickness different from that of the first outer stress relief adhesive layer 121 and/or the second outer stress relief adhesive layer 122. In some embodiments, the thickness of the intermediate stress relief adhesive layer 120 may be substantially equal to the thickness of the first outer stress relief adhesive layer 121 and/or the second outer stress relief adhesive layer 122. Here, "substantially equal" means that a difference between two values is within +/−10% based on a larger value of the two values.

In some embodiments, the intermediate stress relief adhesive layer 120, the first outer stress relief adhesive layer 121, and the second outer stress relief adhesive layer 122 may each independently have a storage modulus of about 0.1 MPa to about 0.5 MPa at −20° C. In some embodiments, the intermediate stress relief adhesive layer 120, the first outer stress relief adhesive layer 121, and the second outer stress relief adhesive layer 122 may each independently have a storage modulus of about 0.1 MPa to about 0.5 MPa, about 0.12 MPa to about 0.48 MPa, about 0.14 MPa to about 0.46 MPa, about 0.16 MPa to about 0.44 MPa, about 0.18 MPa to about 0.42 MPa, about 0.2 MPa to about 0.4 MPa, about 0.25 MPa to about 0.35 MPa, any range between these values at −20° C.

In some embodiments, the intermediate stress relief adhesive layer 120, the first outer stress relief adhesive layer 121, and the second outer stress relief adhesive layer 122 may each independently have a storage elastic modulus (G') of about 0.03 MPa to about 0.2 MPa at −10° C. In some embodiments, the intermediate stress relief adhesive layer 120, the first outer stress relief adhesive layer 121, and the second outer stress relief adhesive layer 122 may each independently have a storage elastic modulus of about 0.03 MPa to about 0.20 MPa, about 0.04 MPa to about 0.18 MPa, about 0.05 MPa to about 0.16 MPa, about 0.06 MPa to about 0.14 MPa, about 0.07 MPa to about 0.12 MPa, about 0.08 MPa to about 0.11 MPa, about 0.08 MPa to about 0.10 MPa, 0.08 MPa to about 0.15 MPa, about 0.1 MPa to about 0.15 MPa, or any range between these values at −10° C.

In some embodiments, the intermediate stress relief adhesive layer 120, the first outer stress relief adhesive layer 121, and the second outer stress relief adhesive layer 122 may each independently have a storage modulus of about 0.02 MPa to about 0.2 MPa at +40° C. In some embodiments, the intermediate stress relief adhesive layer 120, the first outer stress relief adhesive layer 121, and the second outer stress relief adhesive layer 122 may each independently have a storage modulus of about 0.02 MPa to about 0.20 MPa, about 0.03 MPa to about 0.18 MPa, about 0.04 MPa to about 0.16 MPa, about 0.05 MPa to about 0.14 MPa, about 0.06 MPa to about 0.13 MPa, about 0.07 MPa to about 0.12 MPa, about 0.08 MPa to about 0.11 MPa, about 0.09 MPa to about 0.10 MPa, about 0.05 MPa to about 0.15 MPa, more preferably about 0.05 MPa to about 0.10 MPa, or any range between these values at +40° C.

When the storage modulus of each of the intermediate stress relief adhesive layer 120, the first outer stress relief adhesive layer 121, and the second outer stress relief adhesive layer 122 is out of the above range and too small, physical characteristics of a material of each of the intermediate stress relief adhesive layer 120, the first outer stress relief adhesive layer 121, and the second outer stress relief adhesive layer 122 may be excessively soft, making it difficult to manufacture, and peeling (lifting) may occur during folding due to a decrease in adhesive strength.

On the other hand, When the storage modulus of each of the intermediate stress relief adhesive layer 120, the first outer stress relief adhesive layer 121, and the second outer stress relief adhesive layer 122 is out of the above range and too large, an effect of relieving shear stress generated in the display protector 100 with respect to transformation of the display protector 100 is insufficient.

In some embodiments, the storage modulus of the first outer stress relief adhesive layer 121 may be substantially equal to the storage modulus of the second outer stress relief adhesive layer 122. Here, "substantially equal" means that a difference between two values is within +/−10% based on a larger value of the two values. In some embodiments, the intermediate stress relief adhesive layer 120, the first outer stress relief adhesive layer 121, and the second outer stress relief adhesive layer 122 may have a substantially equal storage elastic modulus.

In some other embodiments, the intermediate stress relief adhesive layer 120, the first outer stress relief adhesive layer 121, and the second outer stress relief adhesive layer 122 may have different storage elastic modulus from one another.

In some other embodiments, the storage elastic modulus of the first outer stress relief adhesive layer 121 may be less than the storage elastic modulus of the second outer stress relief adhesive layer 122. At this time, the storage elastic modulus of the intermediate stress relief adhesive layer 120 may be greater than the storage elastic modulus of the first outer stress relief adhesive layer 121, and may be less than the storage elastic modulus of the second outer stress relief adhesive layer 122.

In some embodiments, the intermediate stress relief adhesive layer 120, the first outer stress relief adhesive layer 121, and the second outer stress relief adhesive layer 122 may each independently have an adhesive strength of about 600 g/in to about 1,500 g/in at a temperature of about 20° C. to about 25° C. In some embodiments, the intermediate stress relief adhesive layer 120, the first outer stress relief adhesive layer 121, and the second outer stress relief adhesive layer 122 may each independently have an adhesive strength of about 600 g/in to about 1,500 g/in, about 650 g/in to about 1,450 g/in, about 700 g/in to about 1,400 g/in, about 750 g/in to about 1,350 g/in, about 800 g/in to about 1,300 g/in, about 850 g/in to about 1,250 g/in, about 900 g/in to about 1,200 g/in, about 950 g/in to about 1,150 g/in, about 1,000 g/in to about 1,110 g/in, or any range between these values.

When the adhesive strength of each of the intermediate stress relief adhesive layer 120, the first outer stress relief adhesive layer 121, and the second outer stress relief adhesive layer 122 is out of the above range and too small, the adhesive strength is insufficient and an attachment of a display protector is difficult to maintain.

On the other hand, when the adhesive strength of each of the intermediate stress relief adhesive layer 120, the first outer stress relief adhesive layer 121, and the second outer stress relief adhesive layer 122 is out of the above range and too large, the display protector 100 is difficult to peel from an attached electronic device when needed to be replaced, and there is a risk of damaging an electronic device display during peeling.

UTG layer

The UTG layer 130 may be a layer formed of a tempered glass material having a thickness of about 25 micrometers (μm) to about 70 μm. In some embodiments, the UTG layer 130 may have a thickness of about 25 μm to about 70 μm, about 30 μm to about 70 μm, about 32 μm to about 70 μm, about 34 μm to about 65 μm, about 36 μm to about 60 μm, about 38 μm to about 55 μm, about 40 μm to about 50 μm, about 25 μm to about 65 μm, about 25 μm to about 60 μm, about 25 μm to about 55 μm, about 25 μm to about 50 μm, or any range between these values.

When the thickness of the UTG layer 130 is out of the above range and too thin, an impact resistance may be insufficient. When the thickness of the UTG layer 130 is out of the above range and too thick, the UTG layer 130 may be easily damaged by repeated folding or rolling, and a repulsive force becomes strong when folding. In particular, a repulsive force may be excessively generated in the UTG layer 130 at a thickness exceeding 50 μm in some cases.

The UTG layer 130 may include, for example, aluminosilicate, alkali-aluminosilicate, borosilicate, alkali-borosilicate, aluminoborosilicate, alkali-aluminoborosilicate, sodalime, or other suitable glass, but is not limited thereto. In some embodiments, the UTG layer 130 may be obtained from mother glass commercially available from NEG company, Corning company, Schott company, or the like.

The mother glass is formed into the UTG layer 130 by applying a sliming operation, a cutting operation cutting the mother glass into a cell-shape, a glass strengthening operation, an anti-fingerprint (AF) coating operation, or the like on the mother glass. In addition, a shatterproof coating operation may also be applied.

In some embodiments, a scattering-prevention coating layer, such as an ultraviolet (UV) curable resin, is not provided on the UTG layer 130. This is because the scattering-prevention coating layer is not needed. In other words, when a display protector in the related art is detached to be removed from a display device, a UTG layer may be broken, and a transparent base layer may be damaged. Furthermore, there were cases in which damage was propagated from a damaged portion of the transparent base layer to cause the entire display protector to be separated into two parts.

The inventors of the present invention have discovered that an entire display protector may be prevented from being separated into two parts when removed from a display device by providing a plurality of transparent base layers to the display protector. That is, when removing a display protector, even if a UTG layer is broken and thereby one transparent base layer (i.e., a first transparent base layer) is damaged, the display protector may be prevented from being separated into two parts due to the other transparent base layer (i.e., a second transparent base layer). Alternatively, even if the other transparent base layer (i.e., the second transparent base layer) is damage, the display protector may be prevented from being separated into two parts because crystallographic propagation directions of a polymer forming the transparent base layers are highly likely to be different from each other.

Also, the display protector 100 of the present disclosure has the first transparent base layer 111 and the second transparent base layer 112 with the intermediate stress relief adhesive layer 120 therebetween, and thus, a stress relief effect in a folded portion is excellent. In addition, it was surprisingly found that even when peeling of the folded portion of the display protector occurs with an adhesion surface (e.g., a surface of a display device), the display protector is spontaneously reattached to the adhesion surface after time has elapsed from the time of peeling. This is presumed to be due to an excellent stress relief effect obtained by arranging the intermediate stress relief adhesive layer 120 between the first and second transparent base layers 111 and 112. However, the present disclosure is not limited to any particular theory.

Figure 2A:
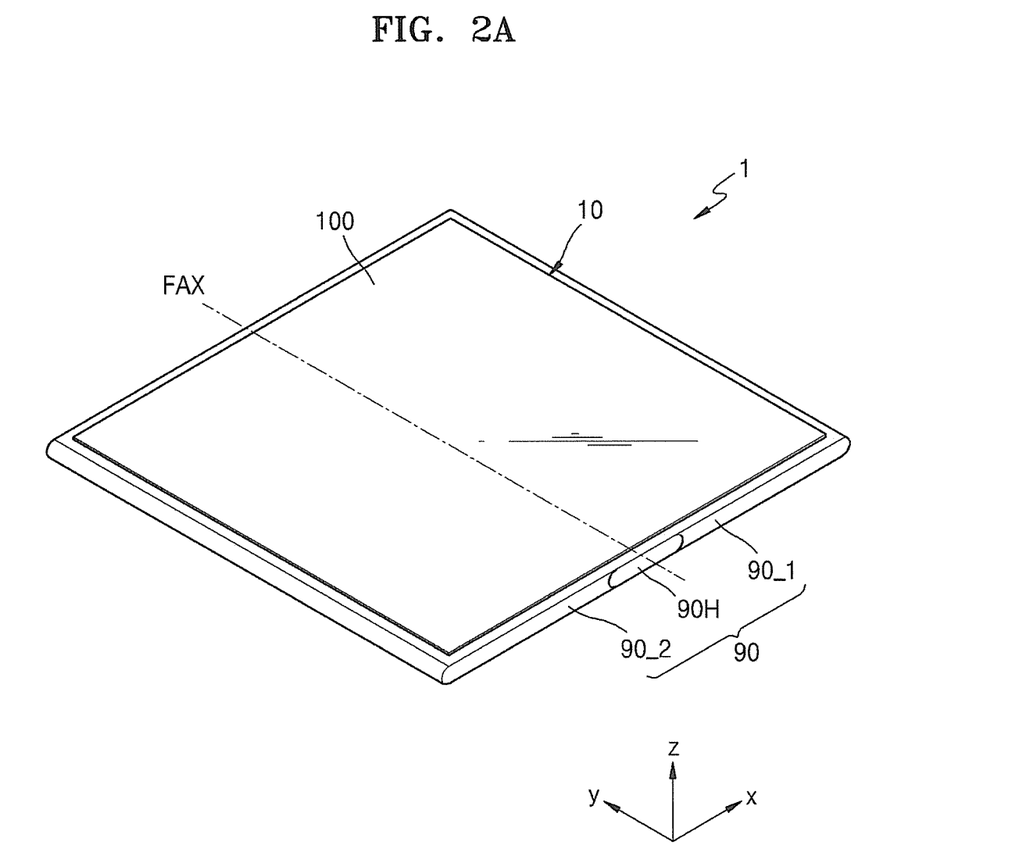
FIG. 2A is a perspective view illustrating a state in which a display protector according to an embodiment is attached to a foldable display device.

FIG. 2A is a perspective view illustrating a state in which the display protector 100 according to an embodiment is attached to a foldable display device 1.

Referring to FIG. 2A, the foldable display device 1 may include a display panel 10 and a lower cover 90. The lower cover 90 may include a first portion 90_1 and a second portion 90_2, which support the display panel 10. The lower cover 90 may be folded around a folding axis FAX between the first portion 90_1 and the second portion 90_ 2. In an embodiment, a hinge portion 90H may be included between the first portion 90_ 1 and the second portion 90_ 2. In addition, in an embodiment, the second portion 90_ 2 may include a transparent material.

The display protector 100 may be provided to cover at least a portion of the display panel 10.

When the foldable display device 1 is folded around the folding axis FAX, the display protector 100 is also folded together. At this time, a folded portion of the display protector 100 has a radius of curvature of about 0.5 mm to about 1.3 mm. Accordingly, the UTG layer 130 (refer to FIG. 1) of the display protector 100 may be tempered glass configured not to be damaged even with a radius of curvature of 0.5 mm, 0.6 mm, 0.7 mm, 0.8 mm, 0.9 mm, 1.0 mm, 1.1 mm, 1.2 mm, and 1.3 mm.

In some embodiments, an AF coating may be further provided on a surface of the UTG layer 130 (refer to FIG. 1).

Figure 2B:
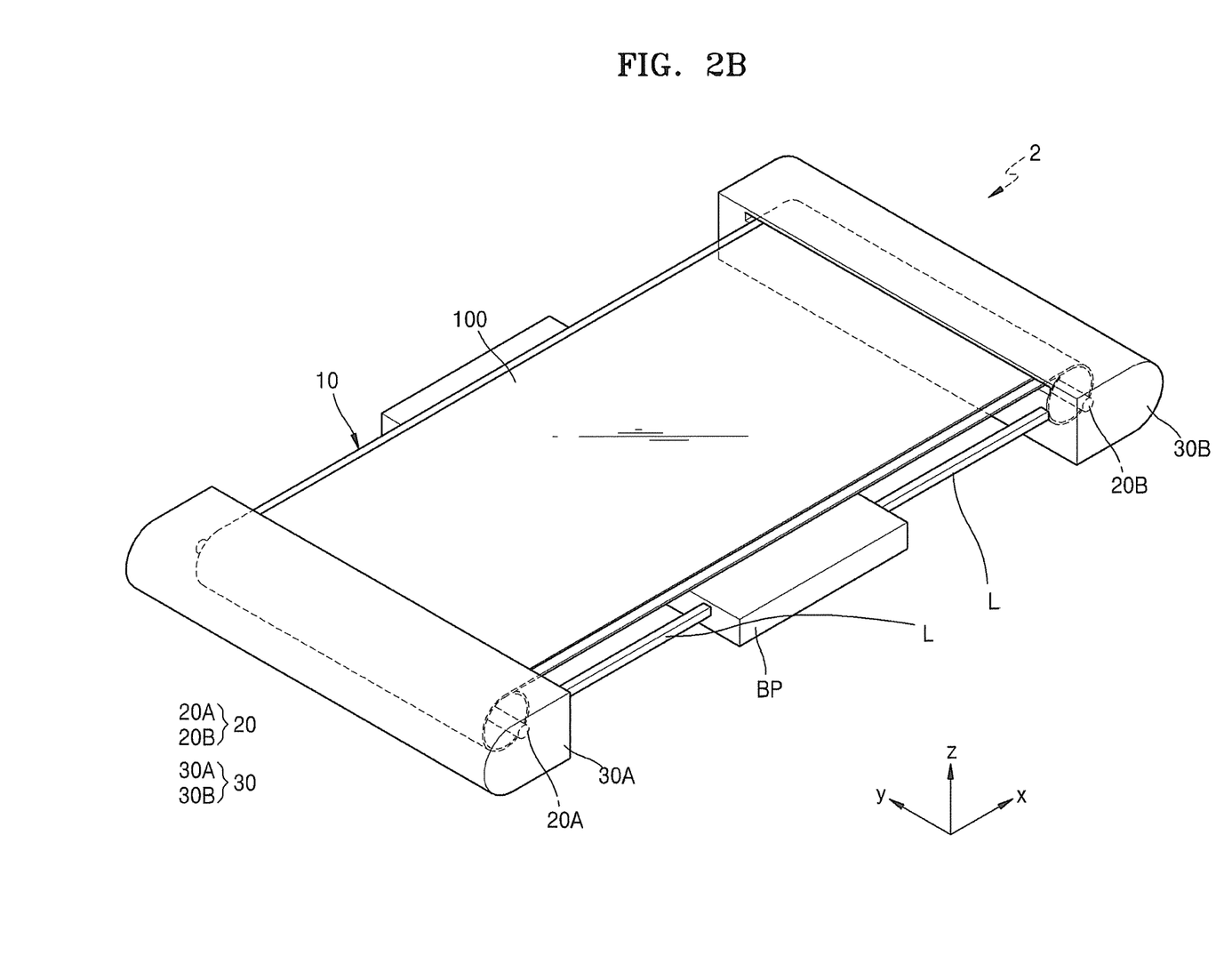
FIG. 2B is a perspective view illustrating a state in which a display protector according to an embodiment is attached to a rollable display device.

FIG. 2B is a perspective view illustrating a state in which the display protector 100 according to an embodiment is attached to a rollable display device 2.

Referring to FIG. 2B, the rollable display device 2 may include the display panel 10, a roller unit 20, a housing portion 30, a module portion BP, and a space adjusting unit L.

The display panel 10 may be a flexible display panel that is flexible and may be easily bent, folded, or rolled. In particular, the display panel 10 may be a rollable display panel which may be rolled or unrolled.

The display panel 10 may be rolled or unrolled by the roller unit 20. For example, when the display panel 10 is rolled on the roller unit 20, the display panel 10 may be exposed by the housing portion 30 by a first interval in a first direction (e.g., +x direction or −x direction) of the display panel 10. When the display panel 10 is unrolled around the roller unit 20, the display panel 10 may be exposed by the housing portion 30 by a second interval greater than the first interval in the first direction (e.g., +x direction or −x direction) of the display panel 10. Accordingly, a size of the display panel 10 exposed by the housing portion 30 and recognized by a user may be changed.

The roller unit 20 may roll the display panel 10. Alternatively, the roller unit 20 may unroll the display panel 10. In some embodiments, the roller unit 20 may be connected to a driving unit. At this time, the driving unit may include a motor or the like, and may rotate the roller unit 20. Alternatively, the roller unit 20 may manually roll or unroll the display panel 10.

In an embodiment, the roller unit 20 may include a first roller unit 20A and a second roller unit 20B. The first roller unit 20A and the second roller unit 20B may be spaced apart from each other in the first direction (e.g., +x direction or −x direction). In some embodiments, one of the first roller unit 20A and the second roller unit 20B may be omitted.

The housing portion 30 may accommodate the roller unit 20. Accordingly, a portion of the display panel 10 may be accommodated in the housing portion 30. A portion of the display panel 10 may be brought into the housing portion 30 or may be taken out of the housing portion 30. The housing portion 30 may include a curved portion. Accordingly, the user may easily grip the housing portion 30.

In an embodiment, the housing portion 30 may include a first housing portion 30A and a second housing portion 30B. The first housing portion 30A and the second housing portion 30B may be spaced apart from each other in the first direction (e.g., +x direction or −x direction). In some embodiments, one of the first housing portion 30A and the second housing portion 30B may be omitted. The first housing portion 30A may accommodate the first roller unit 20A. The second housing portion 30B may accommodate the second roller unit 20B.

The display protector 100 may be provided to cover at least a portion of the display panel 10. In particular, the display protector 100 may be rolled together with the display panel 10 when the display panel 10 is rolled.

When the foldable display device 1 is folded around the folding axis FAX, the display protector 100 is also folded together. At this time, a folded portion of the display protector 100 has a radius of curvature of about 0.5 mm to about 1.3 mm. Accordingly, the UTG layer 130 (refer to FIG. 1) of the display protector 100 may be tempered glass configured not to be damaged even with a radius of curvature of 0.5 mm, 0.6 mm, 0.7 mm, 0.8 mm, 0.9 mm, 1.0 mm, 1.1 mm, 1.2 mm, and 1.3 mm.

In some embodiments, an AG coating may be further provided on a surface of the display protector 100, particularly, on the surface of the UTG layer 130 (refer to FIG. 1).

Hereinafter, configurations and effects of the present disclosure will be described in more detail with reference to particular embodiments and comparative examples, but these embodiments are only for clear understanding of the present disclosure and are not intended to limit the scope of the present disclosure.

<Example 1>

A display protector was prepared, wherein the display protector uses a polyurethane film having a thickness of 12 μm as each of a first transparent base layer and a second transparent base layer, has a first outer stress relief adhesive layer, a second outer stress relief adhesive layer, and an intermediate stress relief adhesive layer as shown in FIG. 1, and has a UTG layer having a thickness of 50 μm on the first outer stress relief adhesive layer. An acrylic optically clear adhesive (OCA) having a thickness of 25 μm was used as each of the first outer stress relief adhesive layer, the second outer stress relief adhesive layer, and the intermediate stress relief adhesive layer.

<Comparative Example 1>

A display protector was prepared in the same manner as in Example 1, except that the second transparent base layer and the intermediate stress relief adhesive layer were omitted.

Test for stress relief effect

After respectively attaching the display protectors of Example 1 and Comparative Example 1 to a display portion of flip-type mobile phones that are folded in a vertical direction (that is, fold lines thereof extend in a horizontal direction), folding-unfolding were repeated 1000 times, 3000 times, and 5000 times, and attachment states of the upper, lower, left, and right ends of the display protectors were inspected.

Figure 3:
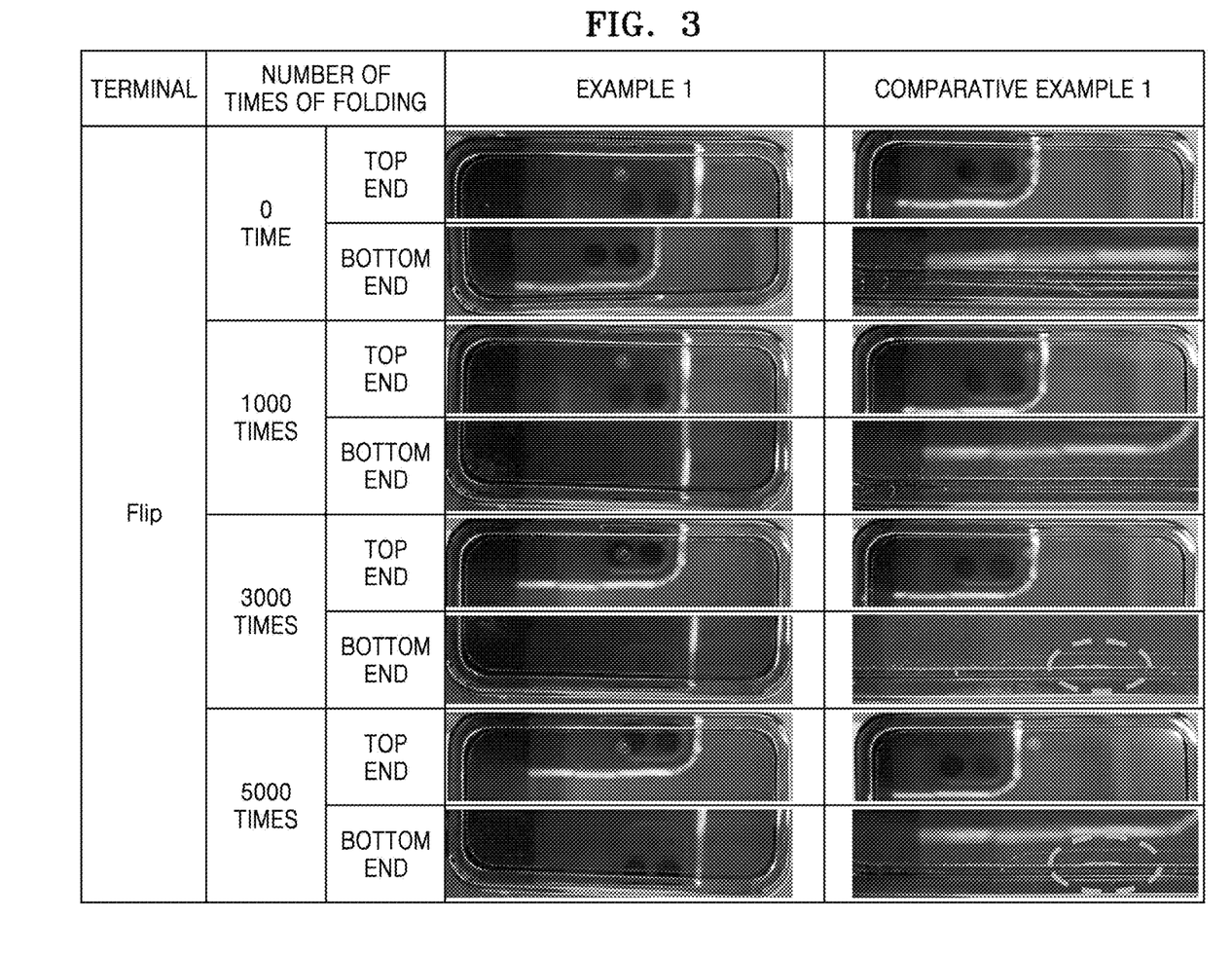
FIG. 3 shows captured images of attachment states at top and bottom ends of a display device after display protectors of Example 1 and Comparative Example 1 were attached, according to the number of repetitions of folding-unfolding.
Figure 4:
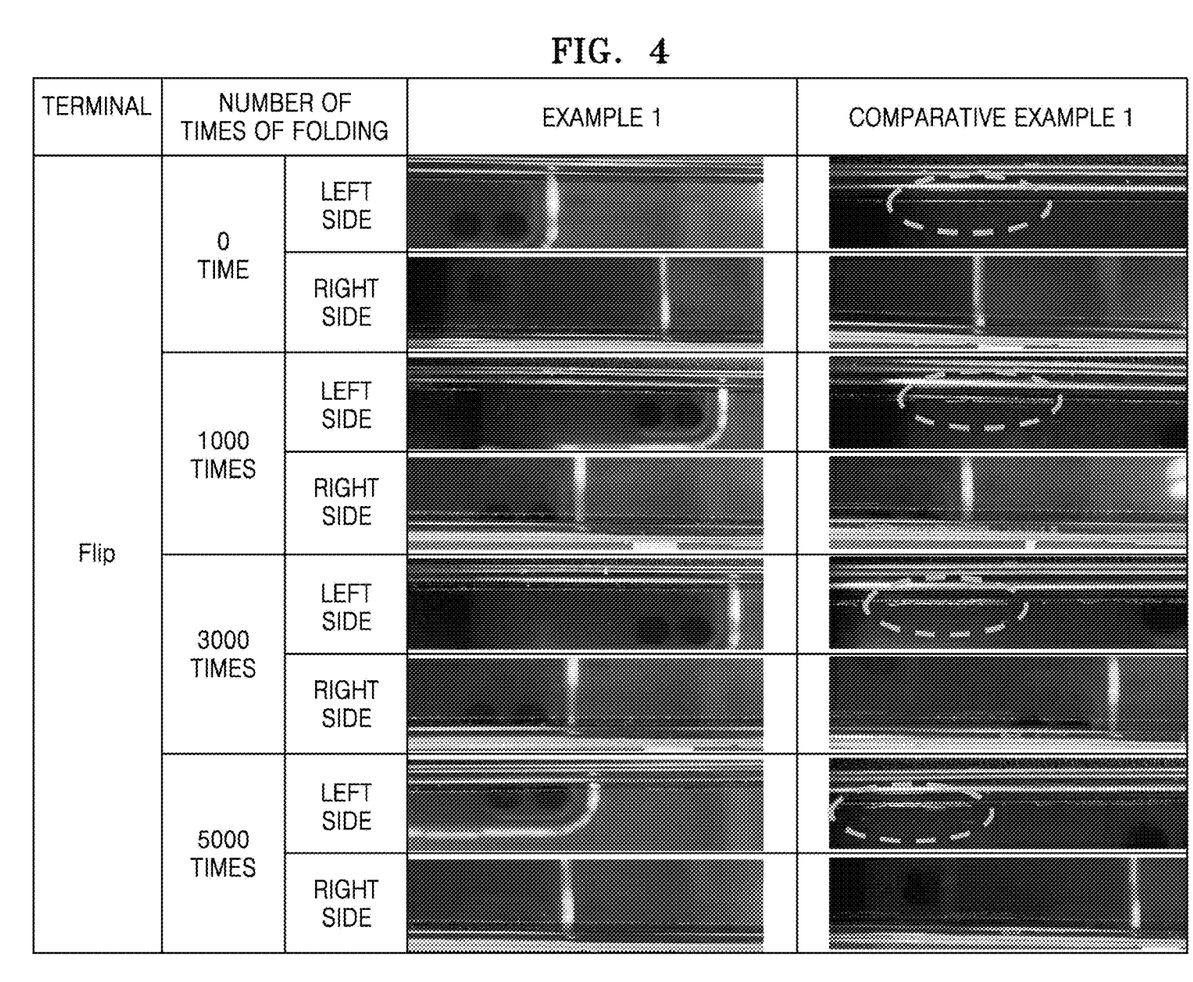
FIG. 4 shows captured images of attachment states at the left and right sides of a display device after the display protectors of Example 1 and Comparative Example 1 were attached, according to the number of repetitions of folding-unfolding.

FIG. 3 shows captured images of attachment states at top and bottom ends of a display device after display protectors of Example 1 and Comparative Example 1 were attached, according to the number of repetitions of folding-unfolding. FIG. 4 shows captured images of attachment states at the left and right sides of a display device after the display protectors of Example 1 and Comparative Example 1 were attached, according to the number of repetitions of folding-unfolding.

As shown in FIG. 3, in the display protector of Example 1, there was no change in the attachment states at the top and bottom ends of the display device, but in the display protector of Comparative Example 1, a defect of a stress relief adhesive layer was observed at a bottom end portion of the display device after 3000 times of folding-unfolding.

Also, as shown in FIG. 4, in the display protector of Example 1, there was no change in the attachments state of the left and right ends of the display device, but in the display protector of Comparative Example 1, a defect of the stress relief adhesive layer was observed in the left portion of the display device after 1000 times of folding and unfolding.

From the above, it was confirmed that the display protector of Example 1 has a more excellent stress relief effect compared to the display protector of Comparative Example 1.

Test of detachment stability

It was tested whether a display protector was torn and separated into parts when the display protector was removed from a display device. In addition to the flip-type mobile phone, the test was performed on a fold-type mobile phone that is folded in the horizontal direction (that is, the fold line thereof extends in the vertical direction).

Figure 5:
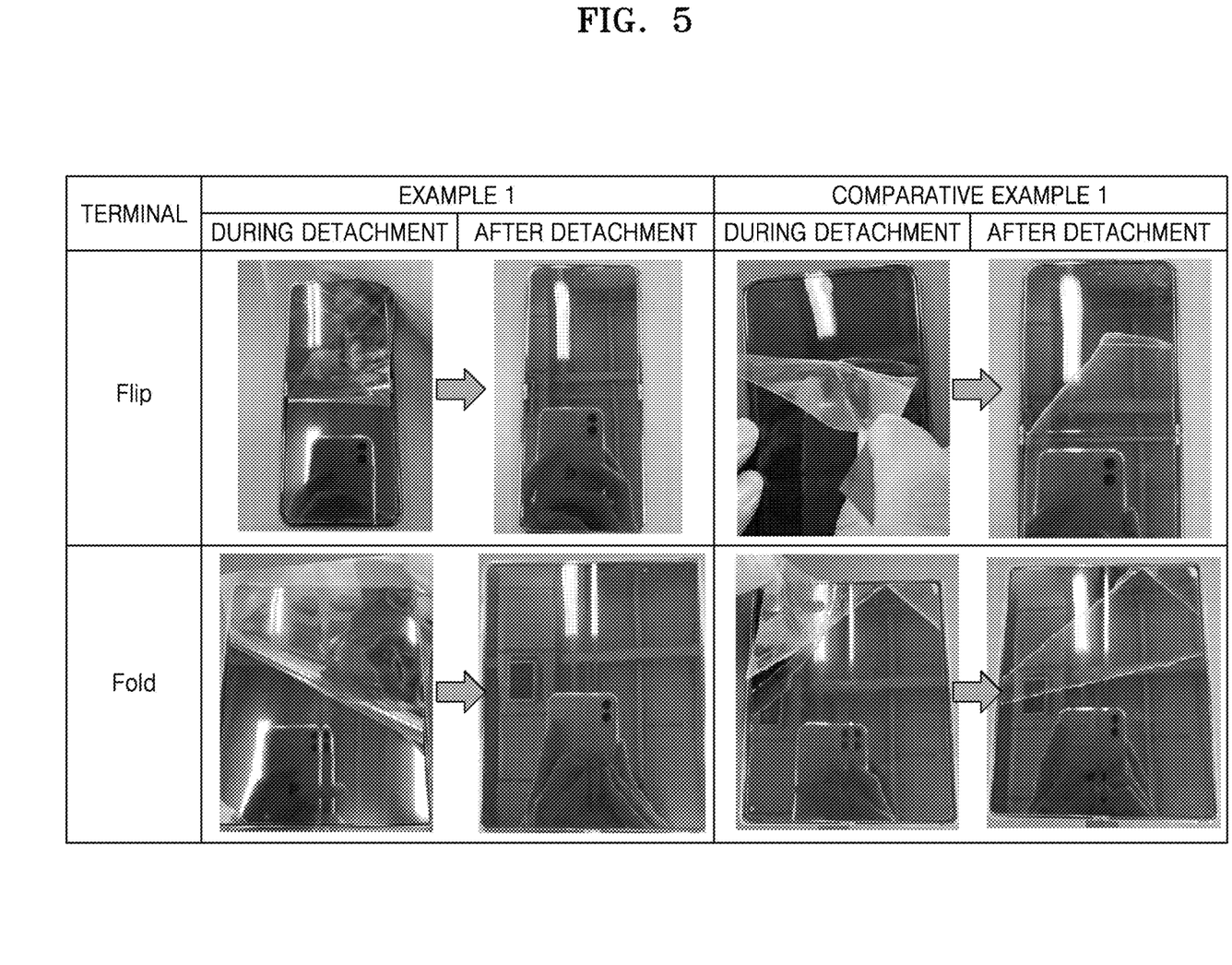
FIG. 5 shows images showing whether the display protectors of Example 1 and Comparative Example 1 were torn apart when detached after being attached to a display device.

FIG. 5 shows images showing whether the display protectors of Example 1 and Comparative Example 1 were torn apart when detached after being attached to a display device.

Referring to FIG. 5, it may be seen that the display protector of Example 1 was clearly detached from both the flip-type and the fold-type mobile phones. However, in the display protector of Comparative Example 1, it was observed that the display protector was torn in both the flip-type and the fold-type mobile phones.

Accordingly, it was confirmed that the display protector of Example 1 has an effect of more excellent detachment stability compared to the display protector of Comparative Example 1.

Test for spontaneous reattachment after peeling

Figure 6:
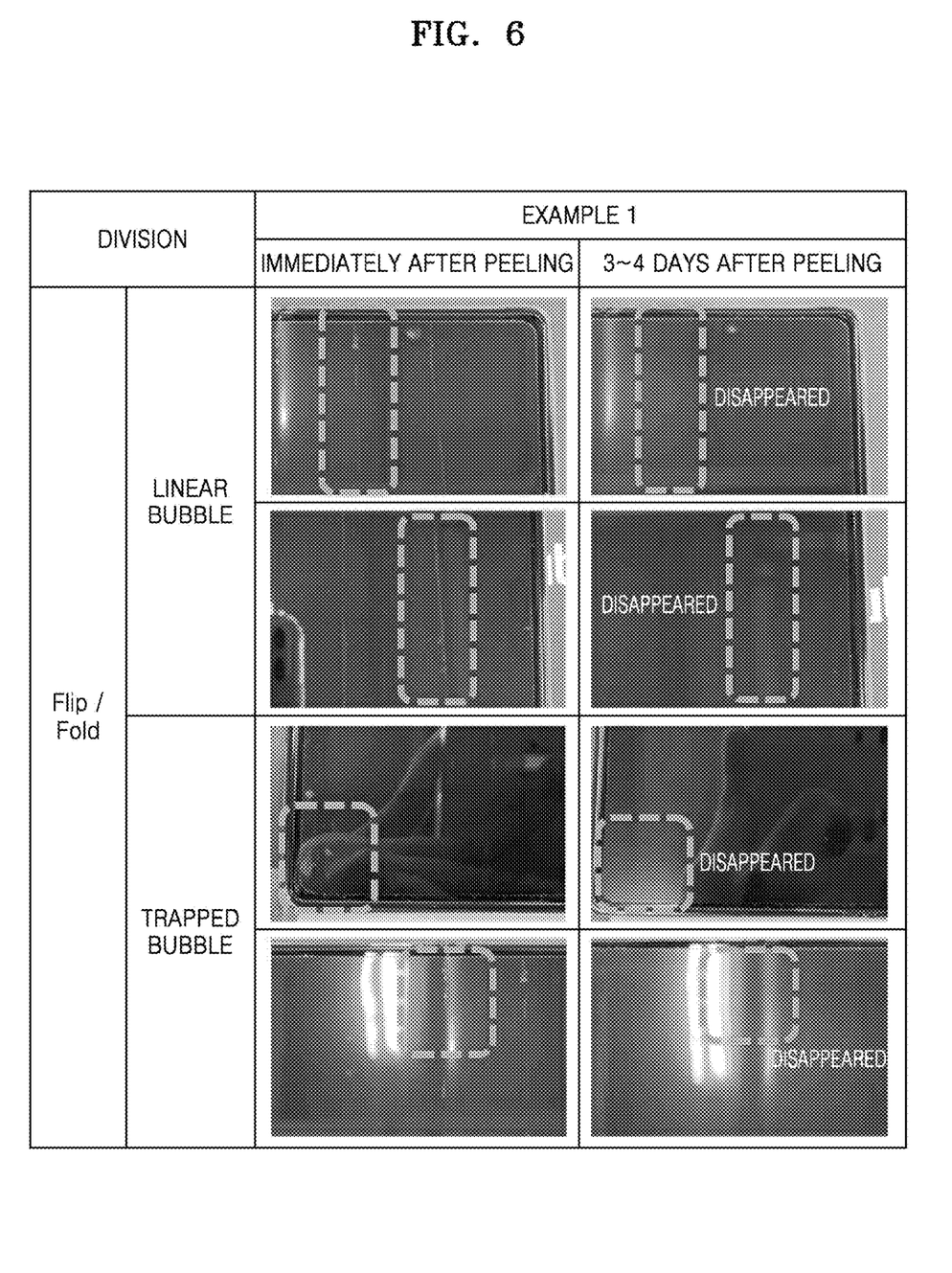
FIG. 6 illustrates the display protector according to Example 1 for the same position when peeling occurred and when three to four days has elapsed.
Figure 7:
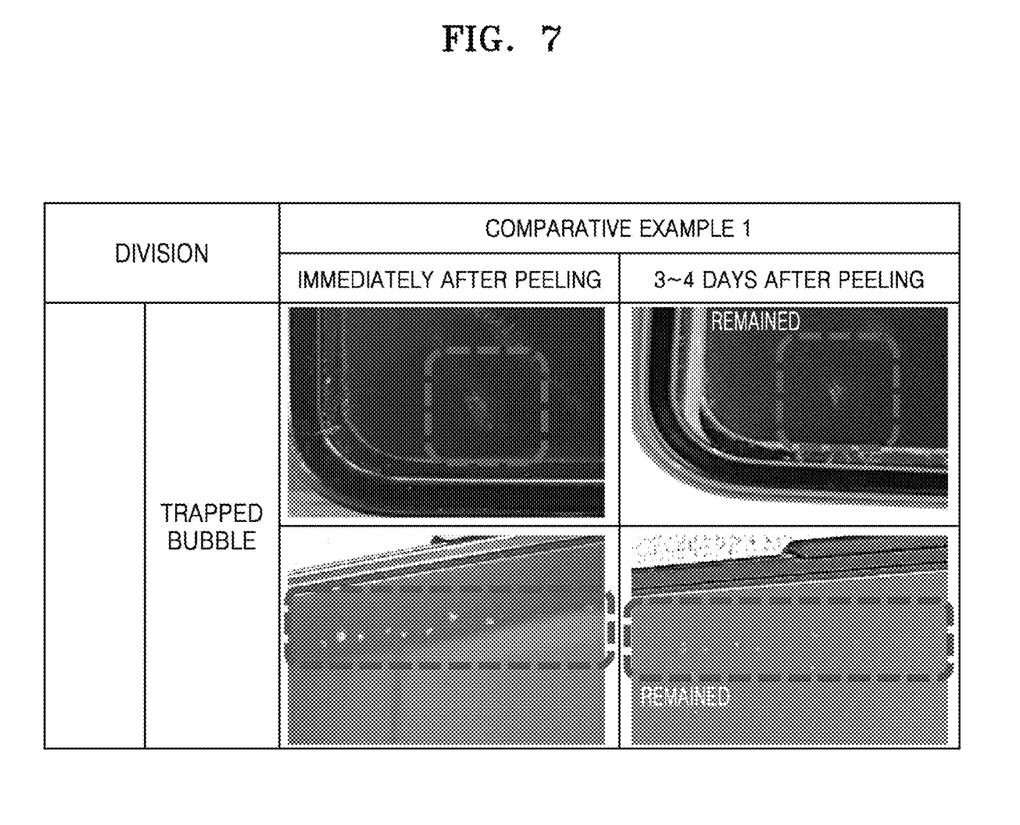
FIG. 7 illustrates the display protector according to Comparative Example 1 for the same position when peeling occurred and when three to four days has elapsed.

A behavior of the display protector was observed when bubbles were generated due to peeling after attaching the display protectors of Example 1 and Comparative Example 1, respectively. FIGS. 6 and 7 illustrate the display protectors according to Example 1 and Comparative Example 1 when peeling occurred and when three to four days has elapsed at the same position.

Referring to FIG. 6, in the display protector of Example 1, when bubbles were generated during use, it was observed that the bubbles disappeared after three to four days and the display protector spontaneously reattached to a display surface.

On the other hand, referring to FIG. 7, in the display protector of Comparative Example 1, when bubbles were generated during use, it was observed that bubbles remained without disappearing even after the same period of time had elapsed.

As shown in FIGS. 6 and 7, the display protector according to an embodiment of the present disclosure may be spontaneously reattached to a display surface after a certain period of time has elapsed even when it is peeled off for some reason. This reattachment phenomenon is presumed to be due to a stress relief effect obtained due to a unique structure of the two transparent base layers and the intermediate stress relief adhesive layer therebetween, but the present disclosure is not limited thereto.

Test for foldability according to storage elastic modulus

To test a relationship between the foldability and the storage elastic modulus of the first transparent base layer and the second transparent base layer, the storage elastic modulus at −20° C. was adjusted by changing an amount of a urethane acrylate oligomer added to the synthesis of the first transparent base layer and the second transparent base layer, and accordingly, the foldability was tested. The test results are summarized in Table 1. In Comparative Examples 3 and 4, 30 parts by weight of an acrylic oligomer and 30 parts by weight of an epoxy oligomer were used instead of the urethane acrylate oligomer, respectively.

TABLE 1

| | Example 1 | Example 2 | Comparative Example 1 | Comparative Example 2 | Comparative Example 3 | Comparative Example 4 |
|---|---|---|---|---|---|---|
| Content of urethane acrylate oligomer (parts by weight) | 30 | 40 | 20 | 50 | 0 | 0 |
| Storage elastic modulus (GPa) | 2.5 | 6 | 1.3 | 8 | 0.4 | 13.6 |
| Foldability | Good | Good | No Good | No Good | No Good | No Good |

The storage elastic modulus (G') was measured using ARES DMA equipment from TA Instruments. In particular, a specimen of 600 μm horizontally and vertically on a disk having a diameter of 8 mm was measured at a ramp rate of 5° C/min from −60° C. to 120° C. at a strain rate of 0.5% and an oscillation frequency of 1 Hz.

The folding test was conducted by attaching the display protectors of Examples 1 and 2 and Comparative Examples 1 to 4 respectively to a display portion of the flip-type mobile phones that are folded in the vertical direction (that is, the fold lines thereof extend in the horizontal direction) and repeating 2000 times of folding-unfolding, and then examining the attachment states of the upper, lower, left, and right ends of the display protectors and the lifting phenomenon of folded portions. When a UTG layer was not broken and no lifting phenomenon occurred up to 2000 times, it was judged as Good, and when a UTG layer was broken and/or a lifting phenomenon occurred, it was determined as No Good.

As shown in Table 1, when the storage elastic modulus of each of the first transparent base layer and the second transparent base layer was as low as 1.3 GPa or 0.4 GPa, the first transparent base layer and the second transparent base layer become too soft and difficult to perform a role as a base layer, and foldability thereof is also reduced. In addition, it was confirmed that when the storage elastic modulus of each of the first transparent base layer and the second transparent base layer was as high as 8 GPa or 13.6 GPa, the restoration property thereof was excessively increased, so the foldability was lowered and cracks were generated in a UTG layer.

The display protector of the present disclosure has excellent folding reliability so as not to peel off even when used for a long time on a foldable terminal or a rollable terminal, is capable of spontaneously being reattached after peeling, and is relatively easily detachable when desired.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A display protector comprising:
a first transparent base layer having a first surface and a second surface which face each other;
a second transparent base layer having a third surface and a fourth surface which face each other, and arranged so that the third surface faces the second surface;
an intermediate stress relief adhesive layer arranged between the second surface and the third surface;
a first outer stress relief adhesive layer over the first surface;
a second outer stress relief adhesive layer over the fourth surface; and
an ultra-thin glass (UTG) layer on the first outer stress relief adhesive layer,
wherein a material of the first transparent base layer is substantially the same as a material of the second transparent base layer, and wherein the material of the first transparent base layer and the second transparent base layer have a storage elastic modulus of about 2 GPa to about 6 GPa at −20° C.

2. The display protector of claim 1, wherein a thickness of the first transparent base layer is substantially equal to a thickness of the second transparent base layer.

3. The display protector of claim 2, wherein a thickness of the first outer stress relief adhesive layer is substantially equal to a thickness of the second outer stress relief adhesive layer.

4. The display protector of claim 1, wherein a storage modulus of the first outer stress relief adhesive layer is less than or substantially equal to a storage modulus of the second outer stress relief adhesive layer.

5. The display protector of claim 1, wherein a storage modulus of each of the first outer stress relief adhesive layer and the second outer stress relief adhesive layer is about 0.1 MPa to about 0.5 MPa at −20° C.

6. The display protector of claim 1, wherein a storage modulus of each of the first outer stress relief adhesive layer and the second outer stress relief adhesive layer is about 0.02 MPa to about 0.2 MPa at +40° C.

7. The display protector of claim 6, wherein;
a storage modulus of the intermediate stress relief adhesive layer is about 0.02 MPa to about 0.2 MPa at +40° C.; and
the storage modulus of the intermediate stress relief adhesive layer is greater than the storage modulus of the first outer stress relief adhesive layer and is less than the storage modulus of the second outer stress relief adhesive layer.

8. The display protector of claim 1, wherein each of the first outer stress relief adhesive layer and the second outer stress relief adhesive layer has an adhesive strength of about 600 g/in to about 1,500 g/in.

9. The display protector of claim 1, wherein there is no scattering-prevention coating layer on the UTG layer.

* * * * *